US012097922B2

(12) United States Patent
Preis et al.

(10) Patent No.: US 12,097,922 B2
(45) Date of Patent: Sep. 24, 2024

(54) MOTORCYCLE WITH HANDLEBAR PROTECTOR (71) Applicant: KTM AG, Mattighofen (AT)

(72) Inventors: Maximilian Preis, Assling (DE); Andreas Ott, Schechen (DE)

(73) Assignee: KTM AG, Mattighofen (AT)

( * ) Notice: Subject to any disclaimer, the term of this patent is extended or adjusted under 35 U.S.C. 154(b) by 407 days.

(21) Appl. No.: 17/364,205

(22) Filed: Jun. 30, 2021

(65) Prior Publication Data

US 2022/0001951 A1 Jan. 6, 2022

(30) Foreign Application Priority Data

Jul. 1, 2020 (AT) .............................. A 50555/2020

(51) Int. Cl.
*G08B 23/00* (2006.01)
*B62J 45/414* (2020.01)
*B62J 45/415* (2020.01)
*B62J 45/422* (2020.01)

(52) U.S. Cl.
CPC ........... *B62J 45/422* (2020.02); *B62J 45/414* (2020.02); *B62J 45/415* (2020.02)

(58) Field of Classification Search
CPC ...... B62J 45/422; B62J 45/414; B62J 45/415; B62J 27/00; B62J 50/22; B62J 45/41; B62J 23/00; B62J 45/20; B62J 45/40; B62J 45/412; B62J 45/42; B62J 50/20; B62J 50/21; B62K 21/12; B62M 6/45; B62M 6/50

See application file for complete search history.

(56) References Cited

U.S. PATENT DOCUMENTS

| 5,688,038 A | 11/1997 | Chien |
| 5,871,269 A | 2/1999 | Chien |
| 6,476,714 B2 | 11/2002 | Mizuta |
| 6,588,297 B1 | 7/2003 | Day et al. |
| 6,616,165 B2 | 9/2003 | Tsuji |
| 6,805,023 B2 | 10/2004 | Greetis |
| 7,504,983 B2 * | 3/2009 | Chen .................. G01S 7/03 342/20 |
| D721,013 S | 1/2015 | Fragassi et al. |
| 8,978,809 B2 | 3/2015 | Mori et al. |
| 10,093,379 B2 | 10/2018 | Hines et al. |
| 10,812,645 B2 * | 10/2020 | Montez ................. H04M 1/04 |
| 10,858,061 B2 | 12/2020 | Montez et al. |

(Continued)

FOREIGN PATENT DOCUMENTS

| CN | 206938977 | 1/2018 |
| CN | 208439381 | 1/2019 |

(Continued)

*Primary Examiner* — Toan N Pham
(74) *Attorney, Agent, or Firm* — Wenderoth, Lind & Ponack, L.L.P.

(57) ABSTRACT

A vehicle, in particular motorcycle, includes a frame, handlebars with two handlebar grips and a communication unit with at least one sensor for the acquisition of data relating to the vehicle, and an interface for transmitting the acquired data. A handlebar protector is arranged, preferably centrally, between the handlebar grips and the communication unit is arranged underneath the handlebar protector or at least partially, preferably entirely, within the handlebar protector.

16 Claims, 9 Drawing Sheets

(56) References Cited

U.S. PATENT DOCUMENTS

| | | | |
|---|---|---|---|
| 10,926,824 B2 | 2/2021 | Hines et al. | |
| 2001/0035817 A1 | 11/2001 | Mizuta | |
| 2001/0048403 A1* | 12/2001 | Tsuji | B62J 50/22 345/7 |
| 2002/0020249 A1 | 2/2002 | Darland et al. | |
| 2002/0194945 A1 | 12/2002 | Greetis | |
| 2004/0108348 A1* | 6/2004 | Barnes | B62J 11/00 224/420 |
| 2004/0134303 A1* | 7/2004 | Durham | B62K 21/12 74/551.8 |
| 2004/0160049 A1 | 8/2004 | Durham | |
| 2008/0198061 A1* | 8/2008 | Chen | G01S 7/022 342/20 |
| 2014/0291960 A1 | 10/2014 | Mori et al. | |
| 2016/0221627 A1 | 8/2016 | Hines et al. | |
| 2018/0194421 A1 | 7/2018 | Hines et al. | |
| 2018/0334216 A1 | 11/2018 | Montez et al. | |
| 2019/0149645 A1 | 5/2019 | Montez et al. | |
| 2020/0114999 A1* | 4/2020 | Rhodes | G01K 13/00 |
| 2021/0039737 A1 | 2/2021 | Montez et al. | |
| 2021/0197913 A1 | 7/2021 | Montez et al. | |

FOREIGN PATENT DOCUMENTS

| | | |
|---|---|---|
| EP | 1 361 822 | 5/2008 |
| EP | 3 010 791 | 2/2019 |
| IT | MI20011125 | 11/2002 |
| JP | 2001-219795 | 8/2001 |
| JP | 2014-43208 | 3/2014 |
| JP | 2014-61856 | 4/2014 |
| JP | 2018-69796 | 5/2018 |
| JP | 2018-162000 | 10/2018 |

\* cited by examiner

MOTORCYCLE WITH HANDLEBAR PROTECTOR

BACKGROUND OF THE INVENTION

The invention relates to a vehicle, in particular a motorcycle, having a frame, handlebars with two handlebar grips and a communication unit with at least one sensor for the acquisition of data relating to the vehicle and an interface for transmitting the acquired data.

In vehicles it has become common practice to acquire, record and then graphically analyze certain data on a computer, a tablet or a smartphone, for example relating to the position and speed of the vehicle, the acceleration, the angle of inclination, the ambient temperature and so forth during the journey. This applies in particular to vehicles which are run as a hobby, such as for example motorcycles or (electric) bicycles.

For this purpose, a communication unit is provided, in which sensors for the acquisition of certain data relating to the vehicle are arranged. These data are, possibly after being stored in the communication unit, transmitted via an interface to the device on which the graphic analysis of the data is effected.

In particular in the case of bicycles, such a communication unit is often integrated in a bicycle computer which is fastened to the handlebar. A disadvantage here is that, for example in the event of a fall, the communication unit is unprotected and thus at high risk of being damaged.

In the case of motorcycles, the communication unit is for this reason often arranged inside the motorcycle, which provides good protection against damage. This is true in particular when lateral fairing parts protect the inner workings of the motorcycle. A disadvantage in this arrangement is, however, that the metallic components which surround the communication unit in an arrangement located inside the motorcycle make the GPS reception, in particular, much more difficult. Moreover, other data, such as e.g. the temperature, cannot be acquired at all because of the waste heat from the engine located nearby. Finally, the communication unit is difficult to access in such an arrangement, with the result that a repair or replacement is possible only with considerable effort.

SUMMARY OF THE INVENTION

The object of the present invention is to avoid the above disadvantages and to provide a vehicle with a communication unit which on the one hand is easy to access and on the other hand is protected against external influences and at the same time provides favorable conditions for the acquisition of all kinds of data.

The invention relates to a vehicle, in particular a motorcycle, with a frame, handlebars with two handlebar grips, wherein one handlebar grip is arranged on the right-hand side of the handlebars and one handlebar grip is arranged on the left-hand side of the handlebars, and a communication unit. The communication unit, which is often also known as a CCU (Connectivity Control Unit), has at least one sensor for the acquisition of data relating to the vehicle as well as an interface for transmitting the acquired data. The sensor can be, for example, a GPS sensor, a sensor for measuring the angle of inclination, wherein instead of the angle of inclination also yaw rates can be measured, an acceleration sensor, a temperature sensor, a magnetic field sensor, sensors for measuring atmospheric pressure and atmospheric humidity and so forth. Within the meaning of the invention, sensors which are connected to the communication unit and are protected by the handlebar protector are to be regarded as being part of the communication unit. Moreover, it can however also be provided that data from further sensors arranged at different points on the vehicle can be received and processed by the communication unit. Preferably, the communication unit has several sensors for the acquisition of data relating to the vehicle.

The interface then serves to transmit the acquired data to a device, by which the data are stored and/or—preferably graphically—edited. The transmission of the data can be effected wirelessly, for instance by means of Bluetooth® or WLAN, or by cable. In this case, the interface has a suitable connection, for example a USB, a USB-C and so forth. It is also conceivable that the interface is designed to be connected to a data line, for example in the form of a CAN bus line, via which data and/or control commands are transferred.

A handlebar protector according to the invention is a protective device for the rider of the vehicle. In the event of a fall, such a handlebar protector in particular protects the chest area of the rider from an impact with the hard handlebar parts, usually consisting of metal. An impact with the handlebar clamp would have particularly serious consequences. For this reason, the handlebar protector is often arranged above the handlebar clamp.

For a better protective effect, the handlebar protector can contain a cushioning material, in particular a foamed material, which can absorb an impact particularly well. A handlebar protector containing such foamed material is also known as a handlebar pad. The foamed material can be, for example, a thermoplastic polyurethane or a thermoplastic elastomer, for instance a thermoplastic copolyester elastomer. The handlebar protector, in particular the handlebar pad, can have a shell, preferably consisting of hard plastic, which is arranged around the cushioning material, in particular the foamed material. The hard plastic can be, for example, a thermoplastic elastomer, for instance a thermoplastic copolyester elastomer, with a hard component, for example a polyamide, for instance a polyamide of the Akromid® type. Both the foamed material to be used as cushioning material and the hard plastic to be used as shell are known per se in the state of the art.

It is also conceivable that the handlebar protector, in particular the handlebar pad, comprises an upper part made from a cushioning material, for example a foamed material, which is facing the rider in the fitted state. The upper part can be connected, preferably in a detachable or openable manner, to a harder lower part, for example again made from hard plastic. The lower part made from a harder material can be fastened to the handlebars. The advantage of the harder material of the lower part is a more stable connection to the handlebars. The connection between upper part and lower part of the handlebar protector can be realized in the form of a snap-in connection for example, wherein the upper part can additionally or alternatively be pivotably mounted on the lower part.

According to the invention, the handlebar protector is arranged between the handlebar grips and the communication unit is arranged underneath the handlebar protector or at least partially, preferably entirely, within the handlebar protector. The arrangement underneath or within the handlebar protector for one thing effects protection of the communication unit in the case of falls or from other external influences. As the handlebar protector is arranged in the handlebar area, the communication unit is in addition placed in a location which provides optimum conditions to a GPS sensor for the reception of the GPS signal, makes a better acquisition of the angle of inclination as well as a measurement of the ambient temperature possible, as no components that give off heat are arranged in this area. In particular, in the case of an arrangement in the handlebar area the antenna of the GPS sensor can also be made larger than in the case of an arrangement inside the motorcycle.

The vehicle according to the invention can be a motorcycle, wherein in particular enduro motorcycles are suitable as the risk of falling is particularly high in the case of enduro use and therefore the arrangement of a handlebar protector, in particular a handlebar pad, is particularly sensible. However, the invention can also be used in the case of bicycles, in particular electric bicycles, or even in the case of four-wheeled vehicles with handlebars with two handlebar grips, such as for instance quad bikes or skidoos.

In a preferred embodiment, the handlebar protector, preferably also the communication unit, is arranged centrally between the handlebar grips. This guarantees an ideal arrangement, in particular for measuring the angle of inclination. Here, centrally means that the handlebar protector is arranged in the middle between the left-hand and right-hand handlebar grips, thus symmetrically on the handlebars. Moreover, in the case of a central arrangement of the handlebar protector between the handlebar grips, the GPS sensor in the communication unit having an antenna is particularly favorably positioned as the antenna should be arranged as horizontally as possible for optimum reception.

In a preferred embodiment of the invention, the handlebar protector has a recess in which the communication unit can be arranged. Here, the handlebar protector can entirely or at least partially encase the communication unit in the arranged state. A protective lid can be provided, via which the recess is accessible. In particular in the case of a handlebar protector made of foamed material or one with an upper part made of foamed material, the recess can be arranged within the foamed material. A casing, preferably consisting of hard plastic, or a lower part made from such a material can optionally be provided. The casing is designed as a protective lid in one embodiment.

Particularly in the case of single-track vehicles, in particular in the case of motorcycles, there is little space for arranging components. By providing a recess in the handlebar protector, the existing space is utilized extremely well and, through the arrangement of the communication unit, no space is used which is to be available for other components.

If the communication unit is at least partially arranged within a handlebar protector with foamed material, this results in a further advantage that the foamed material at least partially, preferably entirely, surrounding the communication unit separates the communication unit from vibrations. This has proved to be beneficial for the functioning of the sensor or sensors.

The communication unit is either fastened to the motorcycle directly or via a holding device. In particular in the case of an arrangement within the handlebar protector, the handlebar protector or part of the handlebar protector can also be regarded as a holding device for the communication unit.

In a further embodiment of the invention, a holding device is provided, by which the communication unit and/or the handlebar protector are held. The holding device itself is fastened to the handlebars.

The communication unit preferably has a memory, with which the data acquired by the sensor can be stored. This is a memory known per se in the state of the art, such as for example an SSD memory. In principle, however, it is also conceivable that the data acquired by the sensor are transmitted via the interface directly and without being stored in the memory.

In a further embodiment of the invention, the communication unit has a receiving device for receiving data relating to the vehicle status, which are made available for example by a control unit of the vehicle, which is provided with a corresponding transmitting device. These data can be transmitted to the receiving device wirelessly, for instance by means of Bluetooth®, or also by cable. The receiving device can be integrated in the interface or can be connectable to the interface. For example, the current speed, the tire pressure, the tank fill level, oil or coolant temperature, the gear currently engaged or the power currently required, for instance by indicating the opening in the carburetor, can be transmitted to the receiving device. These data are then likewise transmitted via the interface, possibly after being stored in the memory, and can be graphically analyzed.

In one embodiment, the communication unit itself has a computing unit, in particular for compiling statistics from the acquired and/or received data. This is useful, above all, when the interface is designed for the wireless transmission of data, in particular by means of WLAN and/or Bluetooth®. In this case, data processed by the computing unit can be immediately displayed on a smartphone. It would also be possible to display data directly in the display unit of the vehicle, as long as the latter is provided with a corresponding receiving unit for receiving the data transmitted by the interface.

In a further embodiment, the communication unit has a transmitting device with a telecommunications function. This makes it possible to send out an emergency call via the transmitting device in cases where the data acquired by the sensor imply an accident. Here, the GPS data can optionally be transmitted at the same time. This also applies to the case where the vehicle has been stolen. The communication unit can then serve as a tracker for locating the vehicle.

In a further embodiment of the invention, the communication unit has a control device, by which certain vehicle parameters can be set. These parameters relate for example to the tuning and/or configuration of the engine or—in the case of an electronically adjustable chassis—the tuning of individual spring and damping elements, such as for example the suspension strut or the suspension fork.

Preferably, the interface itself is designed to receive data or control commands. Additionally or alternatively, a separate receiving device for receiving data and/or control commands can be provided in the communication unit. The received data or control commands can then be relayed to the control unit, which performs the setting of certain parameters. This has the advantage that the individual vehicle parameters can be input externally, for example on a smartphone, and are then relayed to the vehicle control system via the communication unit.

In a further embodiment of the invention, the communication unit can be connected to a switch for starting and/or stopping the data acquisition by the at least one sensor or has such a switch. The connection here can also be effected wirelessly, for example via WLAN or Bluetooth®. In this case, the beginning of the data acquisition can be started via an app on a smartphone.

In a further embodiment of the invention, the communication unit can be connected to a display or has a display, by which the operating state of the communication unit can be indicated, for instance whether data are currently being acquired by the sensors. The connection to the display can also be effected wirelessly, for example via WLAN or Bluetooth®. This makes it possible for the display to be integrated in the vehicle's central display unit. The display can be an illuminating device, for example an LED lamp, wherein the different operating states of the sensors are, for example, indicated via colors. Thus, glowing in green can indicate that data are being acquired. A yellow color can indicate that data are being transmitted via the interface. A flashing signal can, for example, indicate that the received GPS signal is weak, etc.

BRIEF DESCRIPTION OF THE DRAWINGS

Further advantages and details of the invention are discussed for different embodiment examples with reference to the following figures, in which.

DETAILED DESCRIPTION OF THE INVENTION

Figure 1A:
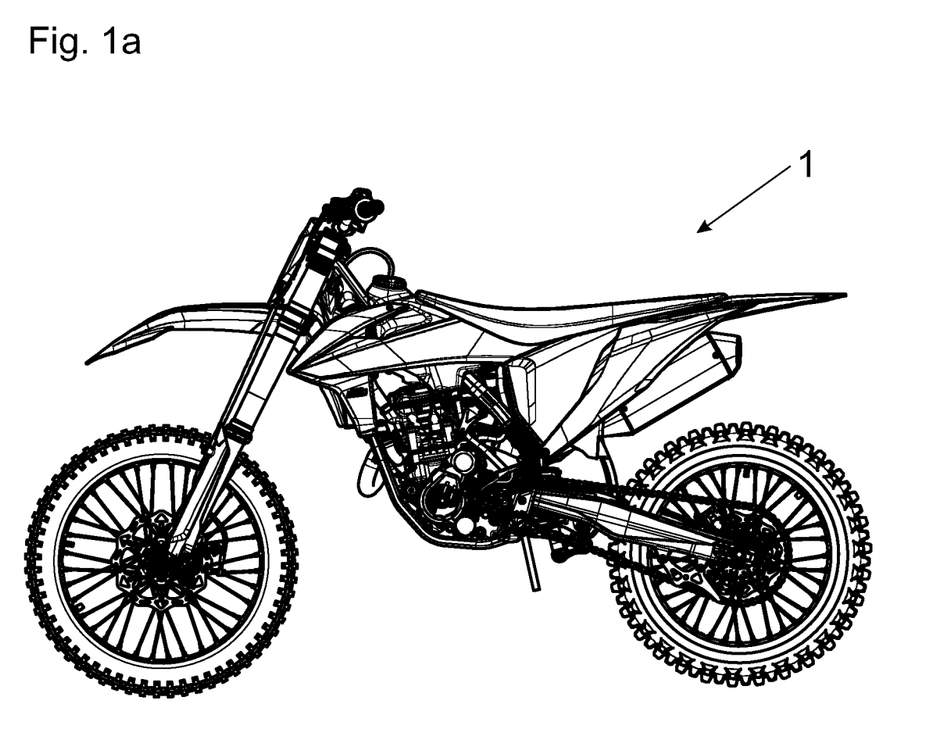
FIGS. 1a to 1c are a side view, a view from behind, and a top view of a motorcycle with a handlebar protector.
Figure 1B:
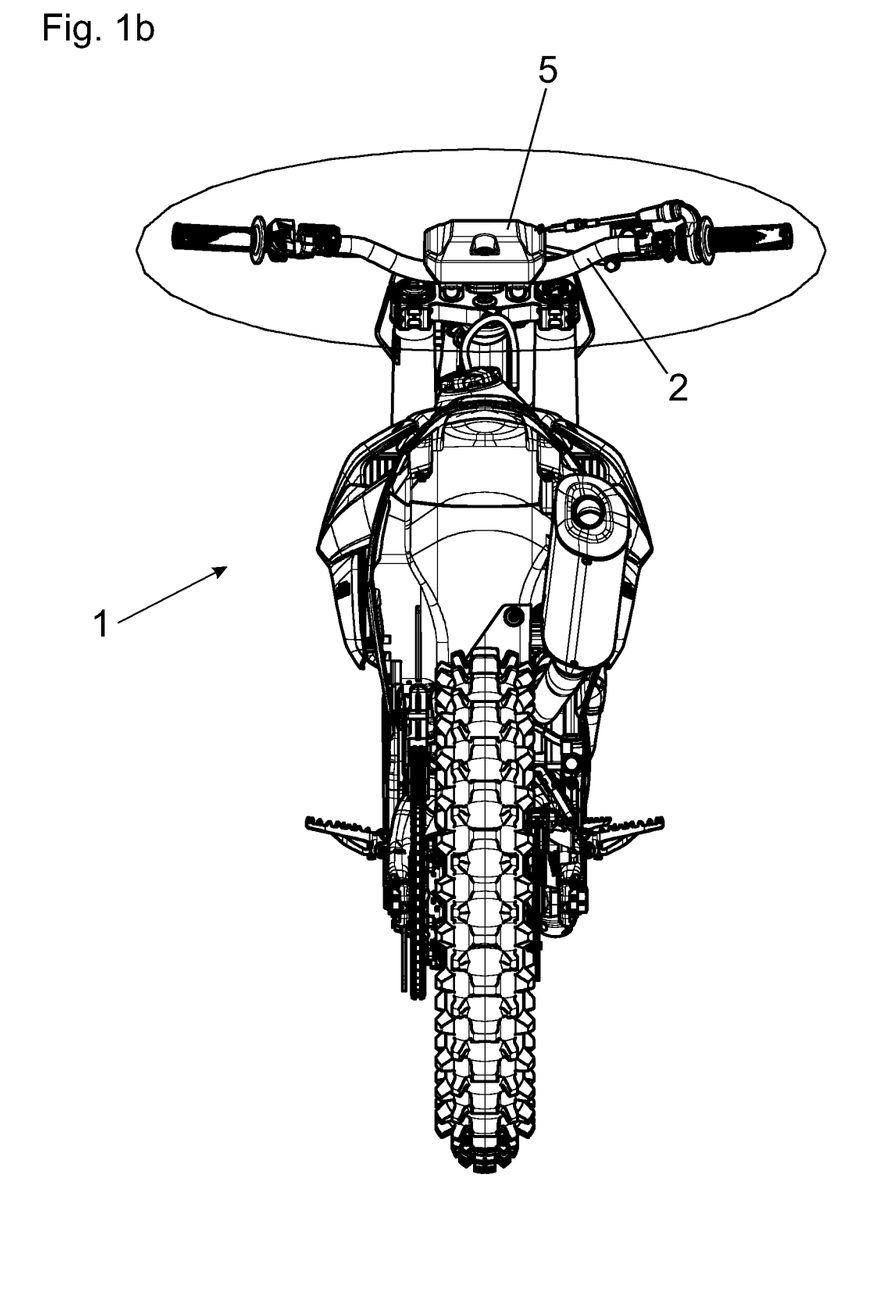
Figure 1C:
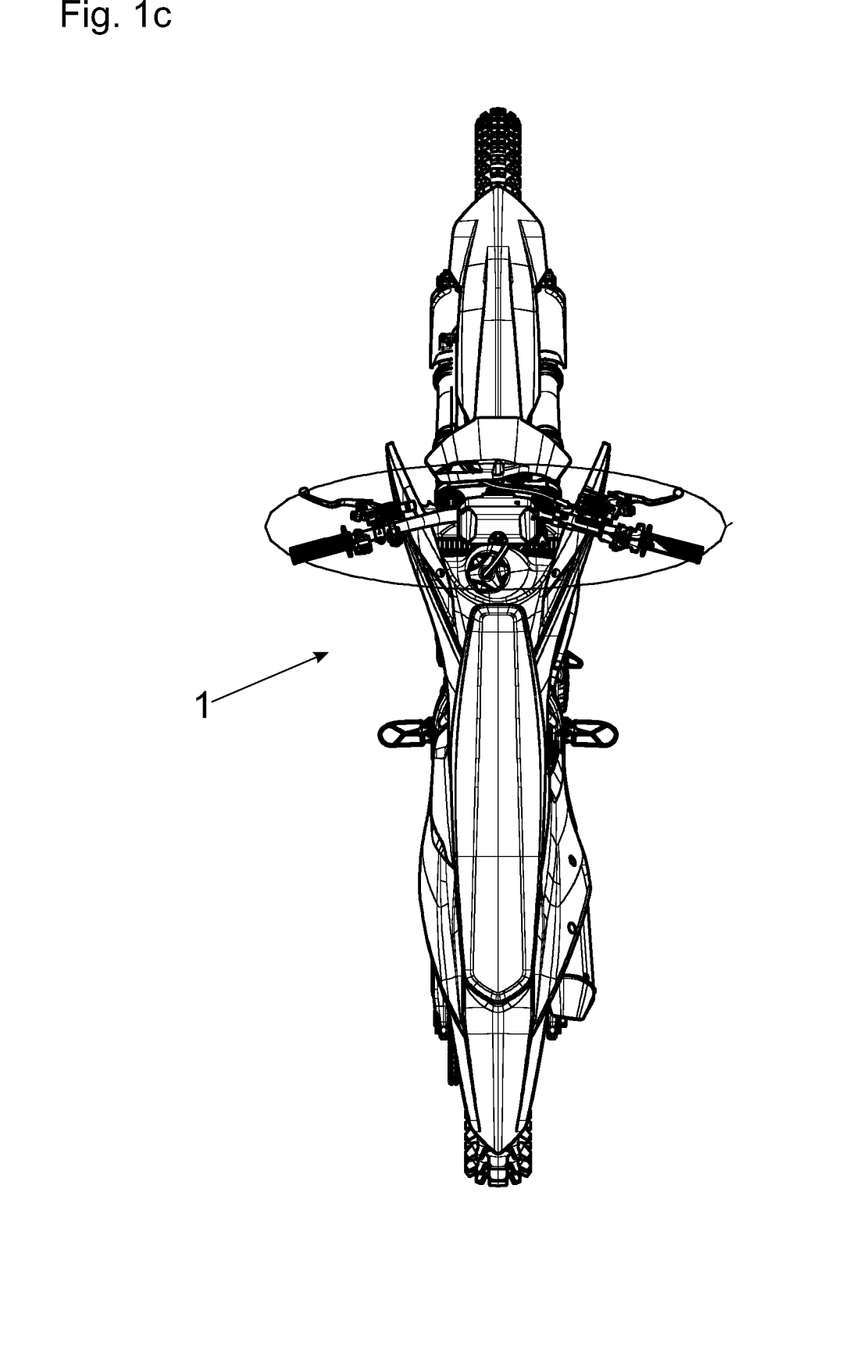

A vehicle 1 in the form of an enduro motorcycle is represented in a side view, a view from behind and a top view in FIGS. 1a to 1c. A handlebar protector 5 according to the invention, made from foamed material, is fastened to the steering wheel 2 centrally between the handlebar grips 3a and 3b and covers the handlebar clamp 13, which is usually made from steel, with the result that an impact, for example of the chest area with the handlebar clamp 13, often has serious consequences. In contrast, an impact with the handlebar protector 5 usually has much less serious consequences.

Figure 2A:
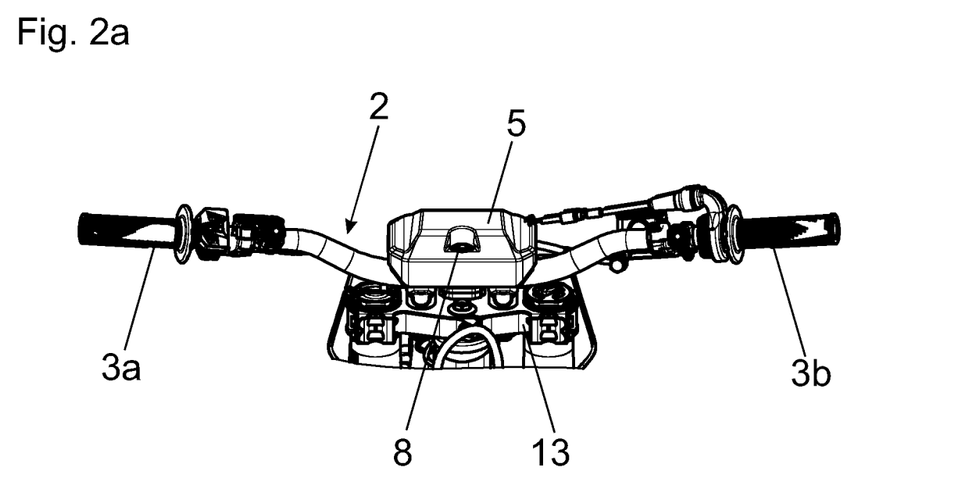
FIGS. 2a and 2b are detail views of FIGS. 1b and 1c.
Figure 2B:
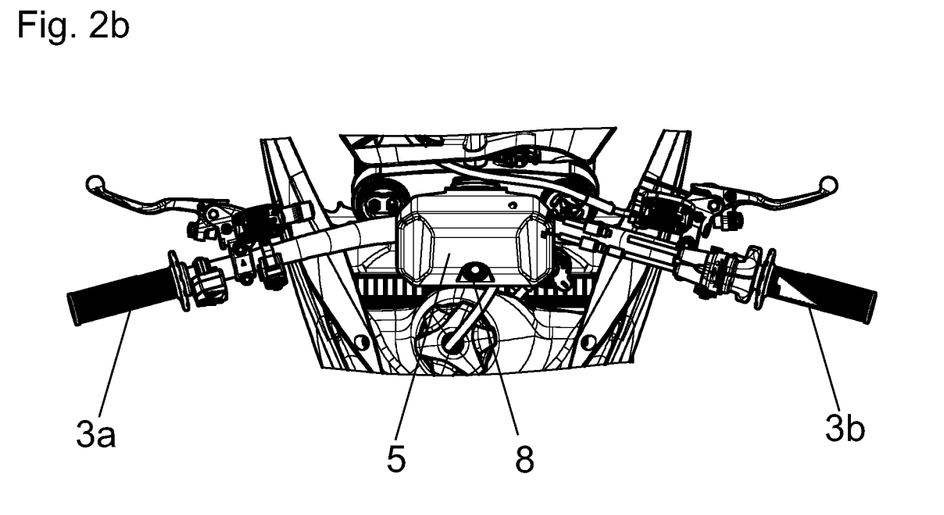

The sections A and B according to FIGS. 1b and 1c are represented in detail views in FIGS. 2a and 2b, wherein it can be seen that the handlebar protector 5 at least partially made from foamed material covers the handlebar clamp 13. A display 8 in the form of an LED ring serves to indicate the operating state of the communication unit 4 arranged in a recess 6 in the handlebar protector 5. For example, when the LED ring glows in a certain color this indicates that GPS login is active. Of course, the display 8 can also have other shapes or designs.

Figure 3:
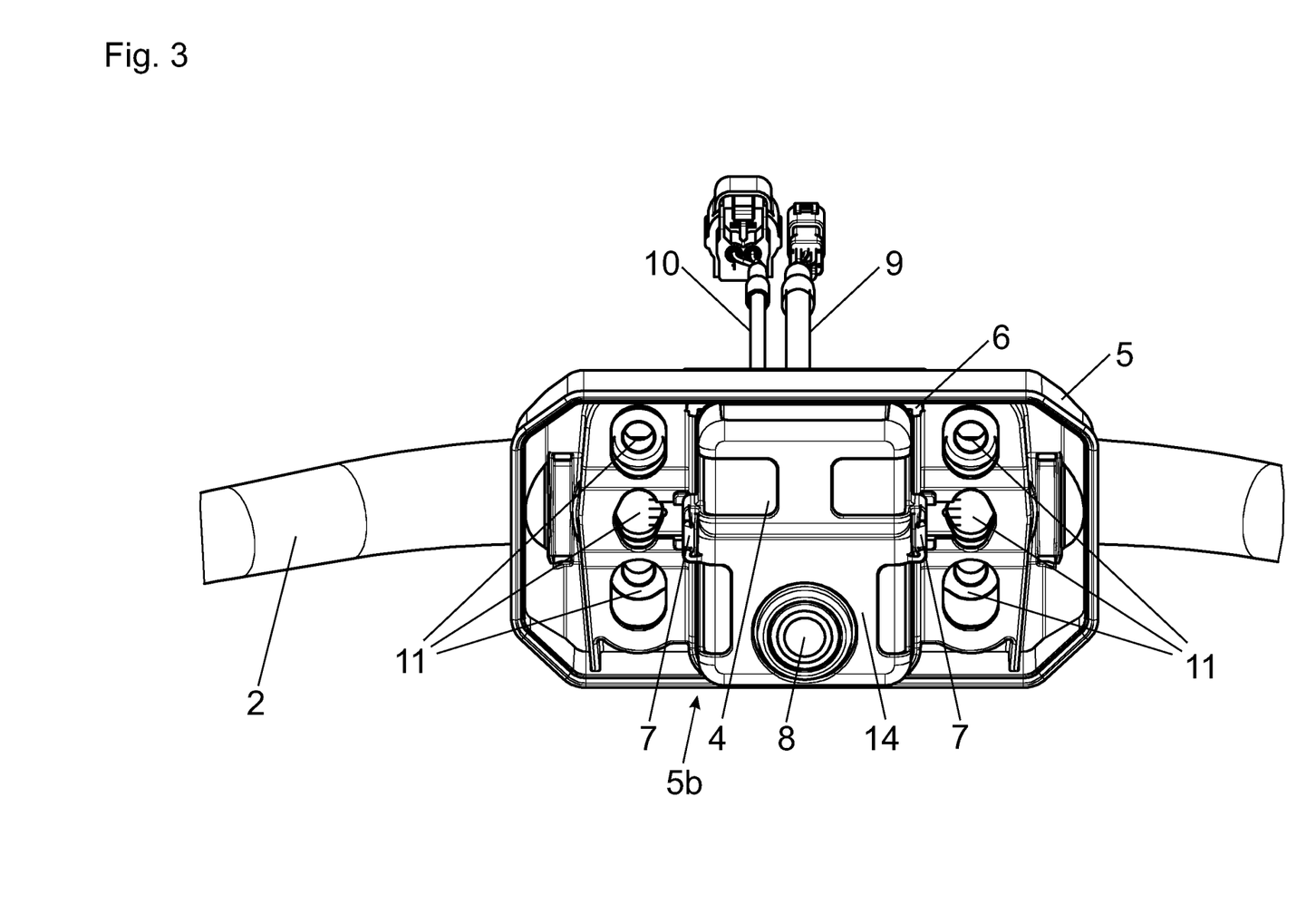
FIG. 3 is a representation of a handlebar protector in the opened state with a communication unit.

A handlebar protector 5 according to the invention in the opened state is represented in FIG. 3. The communication unit 4 arranged in a recess 6 in the lower part 5b of the handlebar protector 5 can be seen and in this embodiment is connected to a power supply line 9 via a receiving device and transmitting device arranged in the communication unit 4. The power supply line 9 can be connected, on the one hand, to the battery of the vehicle 1 and serves to supply power to the communication unit 4, but on the other hand has further cables which serve for data transmission between digital in-and outputs. In particular, in this embodiment, the power supply line 9 also has a CAN bus data line. In summary, parameters relating to the vehicle 1 and control commands are sent to various parts of the vehicle 1 and received by them via the cables contained in the power supply line 9. In this embodiment, in addition to the power supply line 9, a data line 10 is provided, which is a high-speed data line which serves, for example, for the readout of the communication unit 4 or the control device 19 or other control devices of the vehicle 1, and/or can be used to install software for configuration or for firmware updates for these devices.

The communication unit 4 is arranged in a holder 14 made of plastic, which in turn is engaged with snap-in elements 7, which are arranged in the lower part 5b of the handlebar protector 5. The snap-in elements 7 serve to fasten the communication unit 4 in the handlebar protector 5. Of course, a wide variety of options for fastening the communication unit 4 can be imagined, just as there are for fastening the handlebar protector 5 to the handlebars 2. The variants shown are only examples.

In the embodiment shown, openings 11 arranged in the holding device 12 can be seen. The holding device 12 is arranged on the underside of the lower part 5b of the handlebar protector 5 and, in this embodiment, serves to fasten the handlebar protector 5 to the handlebars 2 and also to fix the handlebars 2 to the vehicle 1. Screws 12c, with which the holding device 12 is fastened to the handlebars 2, are inserted into the openings 11.

FIGS. 4a to 4d show the handlebars 2 of the vehicle 1 according to the invention with the handlebar protector 5 in a view from below, a view from behind, a top view and a side view. For reasons of clarity, only parts of the holding device 12 with which the handlebar protector 5 is fastened to the handlebars 2 are represented. In the view from below according to FIG. 4a, openings 11 can be seen in that part 12b of the holding device 12 which is designed to be arranged on the cylindrical central part of the handlebars 2 and to fix the handlebars 2. The lower part 5b of the handlebar protector 5 is in turn fastened to the part 12b. Lateral drilled holes in the lower part 5b of the handlebar protector 5 and of the part 12b of the holding device are used for this in this embodiment and can then be connected by screws inserted into these drilled holes.

Figure 4A:
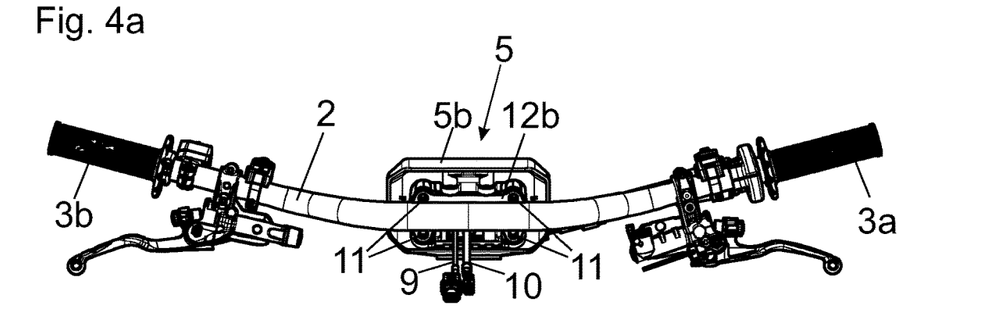
FIGS. 4a to 4d are a view from below, a view from behind, a top view, and a side view of a handlebar protector.
Figure 4B:
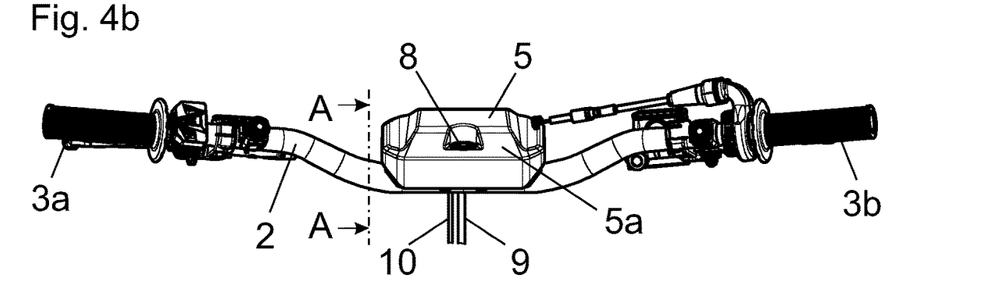
Figure 4C:
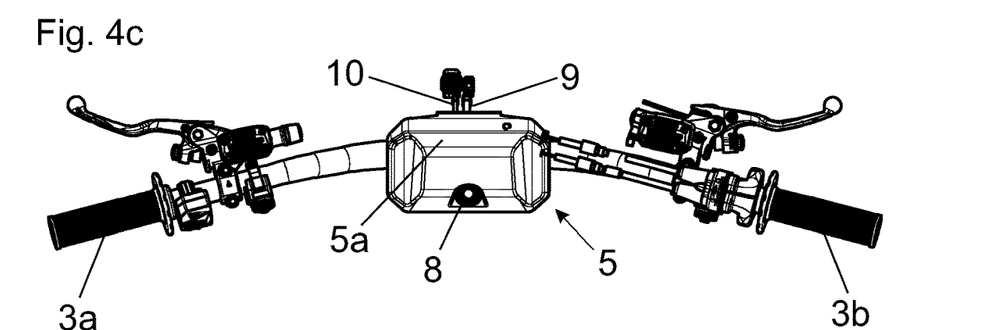
Figure 4D:
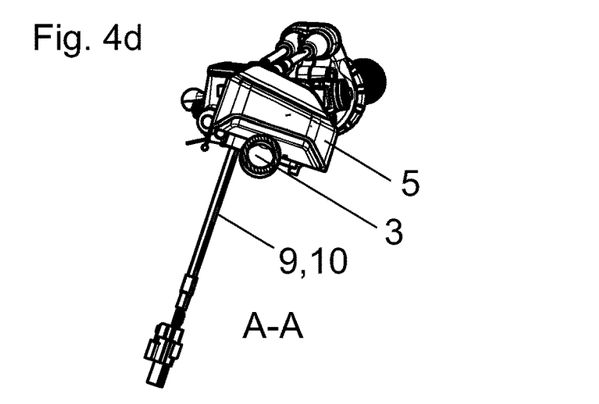

The display 8, which serves to display the operating state of the communication unit 4, can be seen in particular in FIGS. 4b and 4c. The upper part 5a of the handlebar protector 5 acts as a damping element for the rider of the vehicle 1 in the event of a fall and is, for this purpose, made from foamed material. In this embodiment, the upper part 5a can be pivotably fastened to the lower part 5b. Special mounting and fastening elements, for example snap-in elements 16, can be provided for the mounting on and fastening of the upper part 5a to the lower part 5b. Alternatively, the handlebar protector 5 can, however, also be produced in one piece. If the communication unit 4 is arranged within the handlebar protector 5 in the case of a one-piece handlebar protector 5, the communication unit 4 can be arranged in the handlebar protector 5 during the production process. However, an openable handlebar protector 5, in which the upper part 5a integrally connected to the lower part 5b is rotatably mounted, is also possible and the interior of the handlebar protector 5 can thereby be made freely accessible.

The lower part 5b of the handlebar protector 5 can likewise be made from a foamed material, for example as described above. For stability reasons, however, it is preferably provided to make the lower part 5b from a harder material, for example from a hard plastic as described above. This increases the stability of the fastening of the handlebar protector 5 to the handlebars 2. In this embodiment, the recess 6 is arranged in the lower part 5b of the handlebar protector 5. Additionally or alternatively, a further recess can be arranged in the upper part 5a of the handlebar protector 5.

In the embodiment of FIGS. 4a to 4d, the upper part 5a of the handlebar protector 5 can, taken by itself, also be regarded as a separate handlebar protector 5. In this case, the communication unit 4 is arranged underneath the handlebar protector 5. The lower part 5b, including the holding device 12, is in this case to be regarded as a holding device for the handlebar protector 5.

Figure 5A:
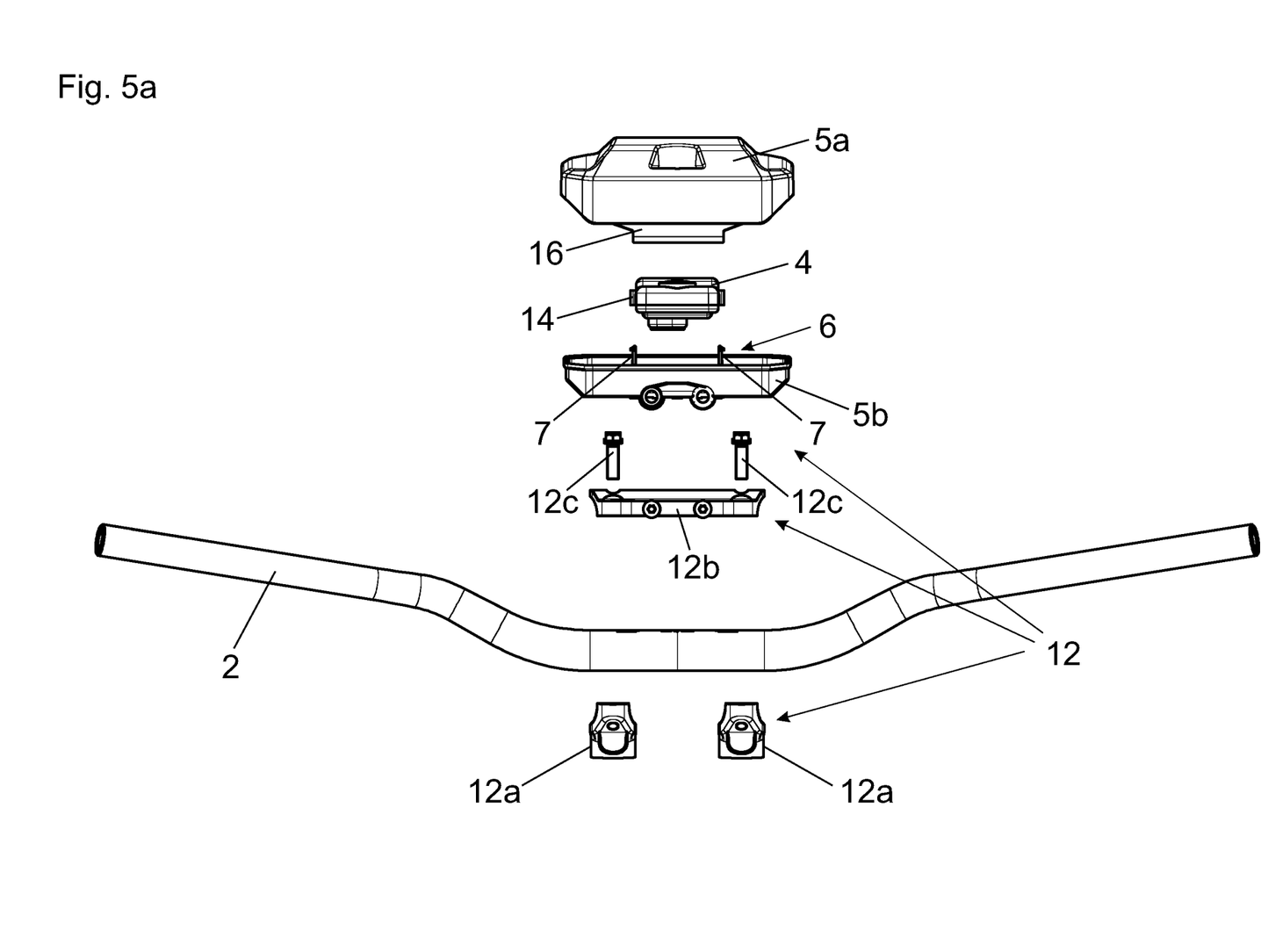
FIGS. 5a and 5b are exploded views of the fastening of a handlebar protector.
Figure 5B:
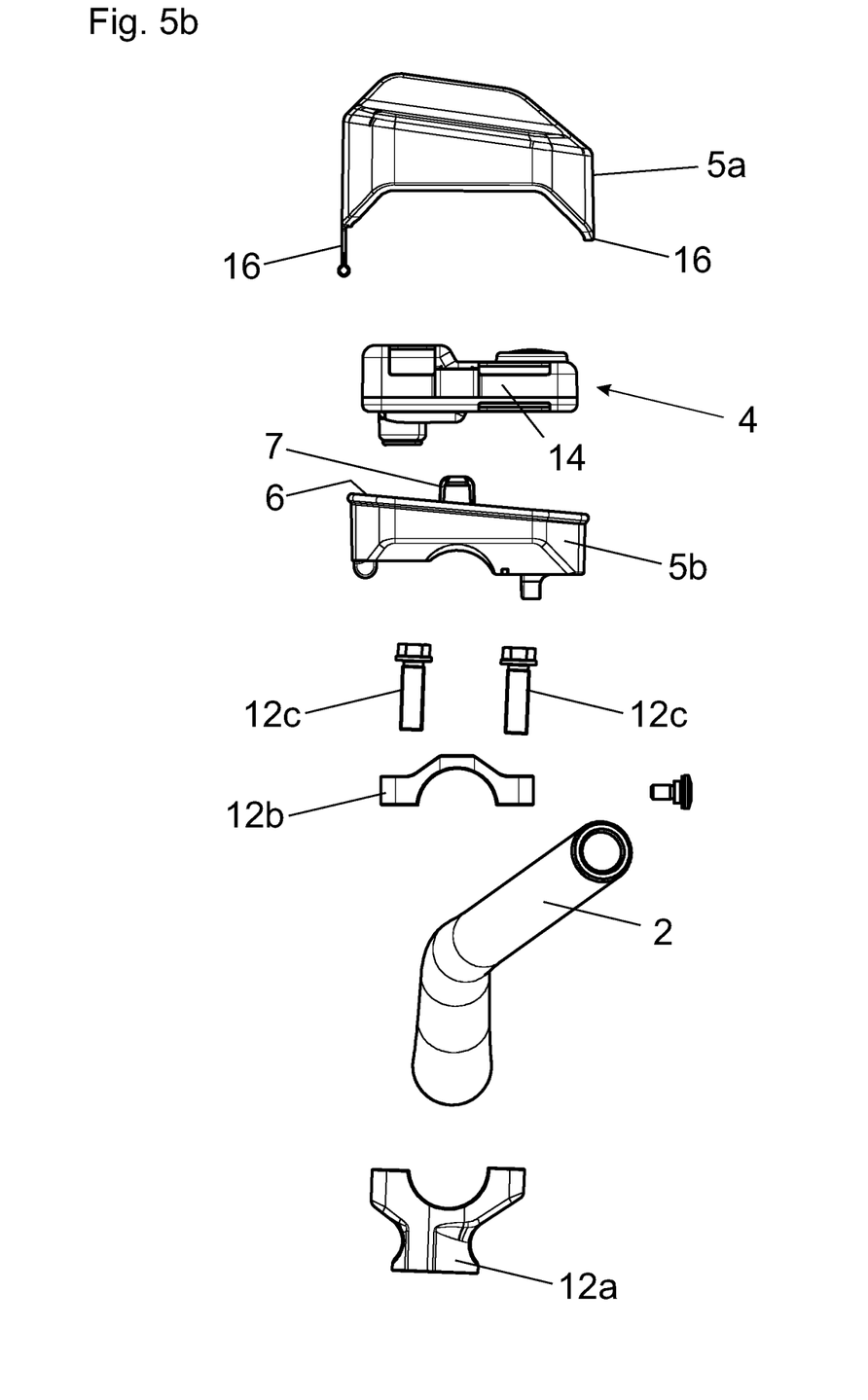

FIG. 5a and FIG. 5b show, in a view from behind and a side view, an exploded view of the essential components of the handlebar protector 5, including the handlebars 2 to which it is fastened. The holding device 12 consists of two elements 12a, which are designed to be arranged on the underside of the handlebars 2 and to fix the handlebars 2 to the frame of the vehicle 1 together with the part 12b of the holding device arranged on the upper side of the handlebars 2. Fastening elements 12c, which can be inserted into openings 11 in the part 12b and corresponding openings in the part 12a, are used for this purpose. Lateral drilled holes, which correspond to lateral drilled holes in the lower part 5b of the handlebar protector 5, are also provided in the part 12b. Screws (represented on the right next to the part 12b in FIG. 5b) can be inserted into lateral drilled holes in the part 12b and in the lower part 5b, with the result that the lower part 5b of the handlebar protector 5 is fastened to the part 12b of the holding device 12. In addition, the lower part 5b can additionally be fastened to the handlebars 2 using zip ties, not represented here. For this purpose, corresponding openings are provided in the lower part 5b.

The lower part 5b furthermore has snap-in elements 7, which can engage in a corresponding recess of the holder 14 of the communication unit 4. The communication unit 4 is thereby fastened in a recess 6 arranged in the lower part 5b. The upper part 5a of the handlebar protector 5 also has snap-in elements 16, with which it can be detachably and pivotably fastened to the lower part 5b. Here, the snap-in element 16 arranged on the left acts as a pivot and is, in the connected state, mounted in a corresponding groove in the lower part 5b. The snap-in element 16 arranged on the right acts as a snap-in lug and engages, in the connected state, on a protruding edge on the lower part 5b. It can be provided to detachably fasten the lower part 5b to the upper part 5a. It can also be provided to design the lower part 5b to be only pivotable, but not detachable. In this case, the element 16 represented on the right can represent a pivot rotatably mounted in the lower part 5b.

The screw represented on the right next to the part 12b is inserted into the lateral drilled holes in the part 12b and in the lower part 5b, whereby the lower part 5b of the handlebar protector 5 is fastened to the part 12b of the holding device 12.

Figure 6:
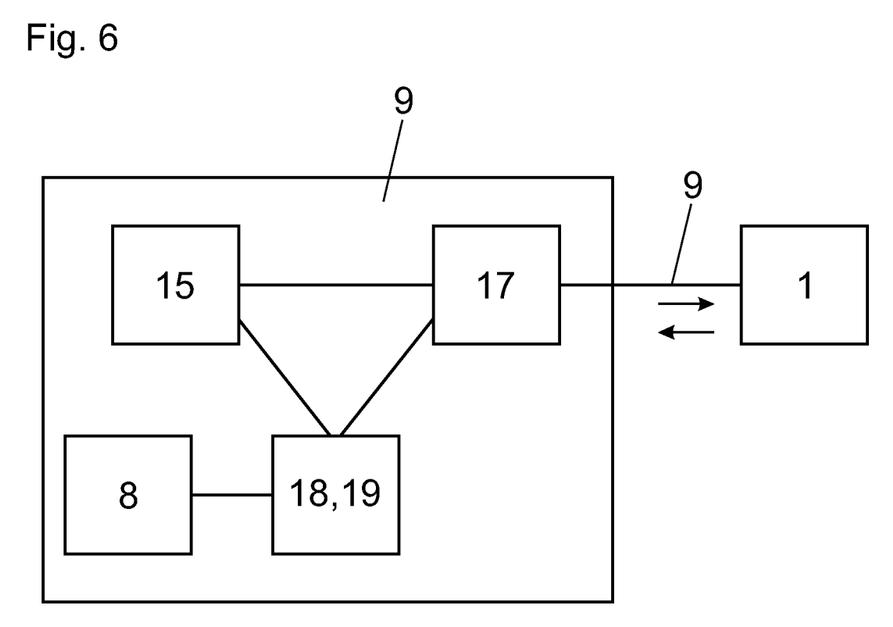
FIG. 6 is a schematic representation of the configuration of the communication unit.

FIG. 6 shows the configuration of a communication unit 4 according to the invention in a schematic representation. The communication unit 4 has a sensor 15 for the acquisition of data relating to the vehicle 1. This can be, for example, a sensor 15 for the acquisition of the GPS data of the vehicle 1, an acceleration sensor and so forth. In particular, the acquisition of GPS signals is made much easier by positioning the sensor 15 in the communication unit 4 on the handlebars 2. The communication unit 4 furthermore has an interface 17, which can transmit data and/or control commands to the vehicle 1 or receive them from the vehicle 1 via a data line 9. The transmission of these data and the control commands can also be effected wirelessly, for example via WLAN or Bluetooth®. The interface 17 can also be designed as a receiving device and/or as a transmitting device.

The communication unit 4 furthermore has a computing unit 18 and a control device 19. The computing unit 18 serves to process the data acquired by the sensor 15 or the data received by the interface 17. The control device 19 serves to generate control commands, possibly based on the acquired or received data, wherein the control commands are transmitted to the vehicle 1 via the interface 17.

Furthermore, the communication unit 4 has a display 8 for displaying the functional state of the communication unit 4.

LIST OF REFERENCE NUMBERS

1 vehicle
2 handlebars
3a, 3b handlebar grips
4 communication unit
5 handlebar protector
5a, 5b upper and lower parts of the handlebar protector
6 recess
7 snap-in elements
8 display
9 power supply line
10 data line
11 openings in the holding device
12 holding device
12a-12c elements of the holding device
13 handlebar clamp
14 holder
15 sensor
16 snap-in elements for the holder
17 interface
18 computing unit
19 control device

The invention claimed is:

1. A vehicle comprising:
    a frame,
    handlebars having two handlebar grips,
    a communication unit including a sensor for acquiring data relating to the vehicle and an interface for transmitting the acquired data, and
    a handlebar protector between the handlebar grips, and the communication unit being arranged underneath the handlebar protector or at least partially within the handlebar protector,
    wherein the handlebar protector comprises an upper part and a lower part, the upper part being arranged to face a rider and being formed of foamed cushioning material to protect the rider, the lower part being formed of plastic harder than the material of the upper part, and the upper part being detachably connectable to the lower part.

2. The vehicle according to claim 1, wherein the handlebar protector has a recess to accommodate the communication unit therein.

3. The vehicle according to claim 1, further comprising a holding device configured to hold the communication unit and/or the handlebar protector, the holding device being fastened to the handlebars.

4. The vehicle according to claim 1, wherein the communication unit further includes a memory for storing the data acquired by the sensor.

5. The vehicle according to claim 1, wherein the sensor of the communication unit is one of a plurality of sensors for acquiring data relating to the vehicle.

6. The vehicle according to claim 5, wherein the plurality of sensors include a GPS sensor, an acceleration sensor, a temperature sensor, and/or an inclination sensor.

7. The vehicle according to claim 1, wherein the communication unit further includes a receiving device for receiving data relating to a vehicle status.

8. The vehicle according to claim 1, wherein the communication unit further includes a computing unit configured to compile statistics from the data.

9. The vehicle according to claim 1, wherein the interface is configured to wirelessly transmit data.

10. The vehicle according to claim 9, wherein the interface is configured to wirelessly transmit data in accordance with WLAN standard and/or Bluetooth® standard.

11. The vehicle according to claim 1, wherein the communication unit further includes a transmitting device having a telecommunications function.

12. The vehicle according to claim 1, wherein the communication unit further includes a control device configured to set a vehicle parameter.

13. The vehicle according to claim 1, wherein the interface is configured to receive data or control commands, and/or the communication unit further includes a receiving device for receiving data and/or control commands.

14. The vehicle according to claim 1, wherein the communication unit is connectable to a switch for starting and/or stopping the data acquisition by the sensor, or the communication unit further includes a switch for starting and/or stopping the data acquisition by the sensor.

15. The vehicle according to claim 1, wherein the communication unit is connectable to a display formed as an illuminating device, or the communication unit further includes a display configured to indicate an operating state of the communication unit.

16. The vehicle according to claim 1, wherein the communication unit is arranged entirely within the handlebar protector.

* * * * *